United States Patent [19]

Wnuk et al.

[11] Patent Number: 5,239,449
[45] Date of Patent: Aug. 24, 1993

[54] SELF-MOUNTING AUTOMOBILE DOME LAMP ASSEMBLY

[75] Inventors: Joseph Wnuk, Westland; Carl G. Czarnecki, Canton, both of Mich.

[73] Assignee: United Technologies Automotive, Inc., Dearborn, Mich.

[21] Appl. No.: 734,845

[22] Filed: Jul. 24, 1991

[51] Int. Cl.$^5$ .................................. B60Q 3/021
[52] U.S. Cl. .................................. 362/80; 362/74; 362/365; 362/374; 296/37.8
[58] Field of Search .................. 362/61, 74, 80, 83.3, 362/226, 364, 365, 368, 370, 374, 375; 296/37.7, 37.8, 214

[56] References Cited

U.S. PATENT DOCUMENTS

| | | | |
|---|---|---|---|
| 4,485,523 | 12/1984 | Higgins | 362/74 |
| 4,499,528 | 2/1985 | Hawlitzki | 362/61 |
| 4,574,338 | 3/1986 | Takasaki et al. | 362/61 |
| 4,893,867 | 1/1990 | Hilborn | 296/214 |

FOREIGN PATENT DOCUMENTS

| | | | |
|---|---|---|---|
| 2001708 | 10/1970 | Fed. Rep. of Germany | 362/226 |
| 1301688 | 1/1973 | United Kingdom | 362/80 |

*Primary Examiner*—Ira S. Lazarus
*Assistant Examiner*—Y. Quach
*Attorney, Agent, or Firm*—Ronald G. Cummings

[57] ABSTRACT

An automobile dome light assembly for mounting directly to a preinstalled headliner having a lamp housing with a bulb socket, power terminal connector and an integrally formed self-contained connector subassembly for securing the lamp housing directly to the headliner. The connector subassembly has a pivotal latching arm for clamping the headliner to the lamp housing with snap lock engagement of the latching arm to the lamp housing.

21 Claims, 1 Drawing Sheet

SELF-MOUNTING AUTOMOBILE DOME LAMP ASSEMBLY

TECHNICAL FIELD

This invention relates to automobile interior components and more particularly to a self-mounting component assembly and mounting technique which has particular utility for an automobile dome lamp.

BACKGROUND AND SUMMARY OF THE INVENTION

Automobile interior components such as dome and reading lamps are typically mounted to the roof by fasteners such as screws. For example, the attachment hardware for mounting a dome lamp assembly generally comprises a metal retaining ring, screws for attaching the retaining ring to the vehicle roof, and screws for securing the lamp assembly to the retaining ring. Mounting the lamp assembly is somewhat of a two step process. The retaining ring is first secured by screw fasteners to a transverse support structure of the vehicle roof known as a roof bow. The lamp assembly is then positioned in an opening in the headliner and secured to the retaining ring by screw fasteners. Thus, the lamp assembly is secured to the vehicle roof via the retaining ring.

It would be desirable to reduce the assembly time and labor required for this two step assembly process as well as the number of parts required for attachment. Minimizing weight is also desirable in automobile applications.

Accordingly, it is an object of the present invention to provide a new and improved dome lamp assembly which reduces assembly time and labor and simplifies the installation process.

Another object of the invention is to provide such a dome lamp assembly which is self-mounting directly to the vehicle headliner without fastener attachment hardware.

A further object of the invention is to provide a dome lamp assembly with an integrally formed and self-contained attachment means.

A still further object of the invention is to provide a dome lamp assembly which can be mounted in a headliner without any tools.

A further object of the invention is to provide a dome lamp assembly which is cost efficient to manufacture and install.

It has been found that the foregoing and related advantages can be obtained in a dome lamp assembly for mounting directly to a headliner installed within an automobile interior. The dome lamp assembly includes a lamp housing for positioning within an opening in the headliner, a detachable lens and a fastenerless connector subassembly for securing the lamp housing directly to the headliner. In a preferred embodiment, the connector subassembly is integrally formed with the lamp housing and is configured for clamping attachment to the headliner. The connector subassembly includes a latching arm pivotably connected to the lamp housing by a living hinge for movement to a latched position where the outer end of the latching arm engages the outer surface of the headliner to clamp the headliner to the lamp housing. The latching arm is configured for snap lock securement in the latched position.

DESCRIPTION OF THE PREFERRED EMBODIMENT

Figure 1:
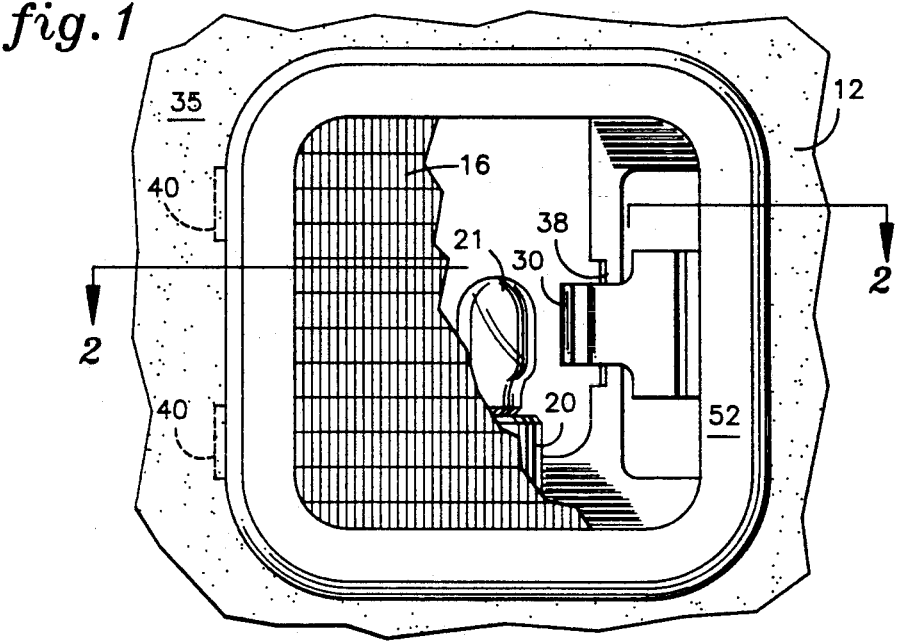
FIG. 1 is a partly broken away view of the dome lamp assembly mounted to an automobile headliner.

Although specific forms of the present invention have been selected for illustration in the drawings, and the following description is drawn in specific terms for the purpose of describing these forms of the invention, the description is not intended to limit the scope of the invention which is defined in the appended claims.

Referring to FIG. 1, the dome lamp assembly of the present invention is shown mounted directly to a headliner substrate 12 installed within an automobile interior (not shown). The dome lamp assembly generally comprises two molded plastic components, namely a lamp housing 14 and a lens 16.

The housing 14 is integrally formed to provide a frame structure 18, a bulb socket 20, a power terminal connector 22 for plug in connection to a power lead and a fastenerless connector subassembly 24 for securing the housing 14 to the headliner 12.

Figure 2A:
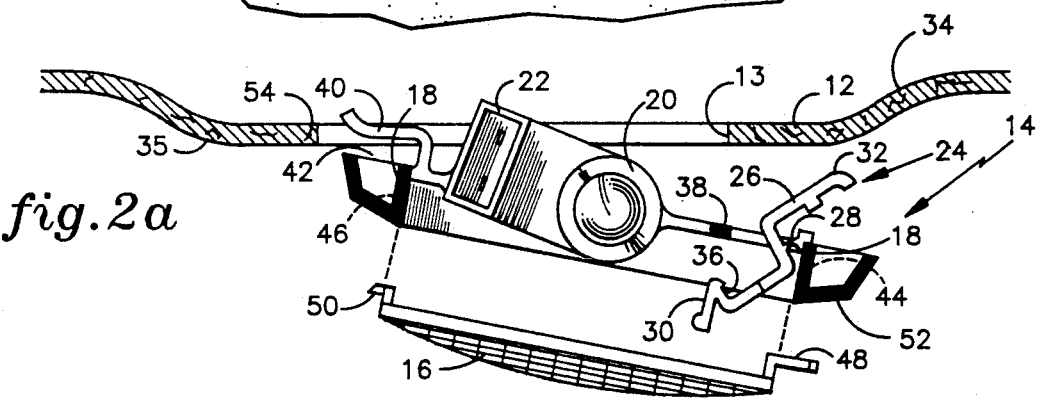
FIGS. 2A–2C are cross-sectional views showing the snap lock mounting sequence of the dome lamp assembly as seen along line 2—2 of FIG. 1.
Figure 2B:
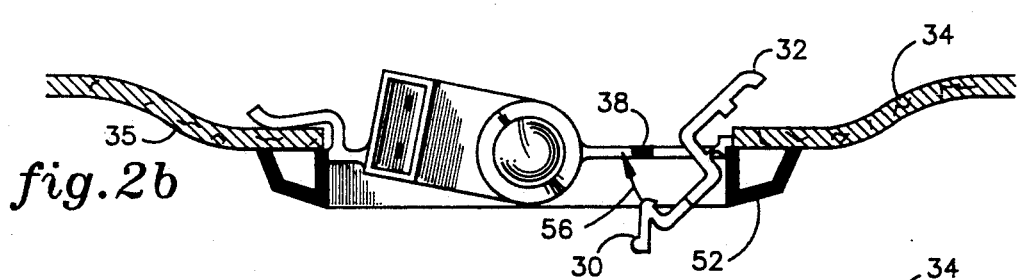
Figure 2C:
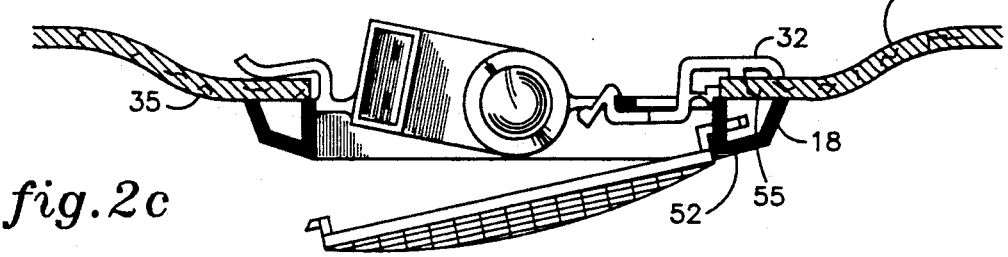

The connector subassembly 24 includes a latching arm 26 pivotably connected to the frame 18 by a living hinge section 28 for pivotable movement of the latching arm between an unlatched position (FIGS. 2A and 2B) and a latched position (FIG. 2C). As understood in the art, a living hinge is a molded web-like interconnecting section of reduced cross section which permits pivotal movement. The latching arm 26 has inner and outer ends 30, 32 respectively. The outer end 32 is configured for clamping engagement against the outwardly facing surface 34 of headliner 12. The inner end 30 is configured to form a snap lock recess 36 for snap lock engagement with a cooperating locking extension 38 of frame 18.

A pair of spaced-apart offset extensions or tabs 40 are disposed on the opposite side of frame 18 from latching arm 26. The tabs 40 and frame 18 form aligned outwardly opening retaining slots 42 dimensioned for friction fit reception of the headliner 12 as shown in FIGS. 2B, 2C.

The frame 18 has a pair of opposing slots 44, 46 for receiving mounting tabs 48, 50 respectively of lens 16. Tab 48 is a hinge tab for insertion in slot 44 to permit pivotable movement of tab 50 toward slot 46, i.e., clockwise angular movement as viewed in FIG. 2C. Tab 50 is a locking tab for snap insertion within slot 46 to lock lens 16 to frame 18. The frame 18 is configured to extend about the periphery of mounting opening 13 in headliner 12 and forms a bezel surface 52 about the lens 16.

In assembling the dome lamp assembly to the headliner 12, the headliner 12 as shown in FIG. 2A is already mounted within a vehicle interior with the headliner surface 35 facing inwardly toward the automobile interior. The unitary housing 14 is positioned within the mounting opening 13 of headliner 12 so that the edge portion 54 of headliner 12 is adjacent the slots 42 formed by tabs 40. The housing 14 is pushed sideways so that the edge 54 is received within the slots 42 while at the same time the outer end 32 of latching arm 26 is positioned to extend upwardly through opening 13 as shown in FIG. 2B. The frame 18 is rotated counterclockwise about edge 54 so that the peripheral section of frame 18 is flush against the inwardly facing surface 35 of headliner 12 as shown in FIG. 2B. In this position, the inner end 30 of locking arm 26 is pivoted clockwise (as indicated by directional arrow 56) until end 30 is in snap lock engagement with the locking extension 38. In this position as shown in FIG. 2C, the edge portion 55 of headliner 12 is securely clamped between the outer end 32 of latching arm 26 and the frame structure 18 to provide a rigid connection. A lens 16 is then snap mounted as previously described. As can be seen, no direct support connection is made between the lamp assembly and the vehicle roof.

Preferably, the housing 14 is a unitary integrally formed component which includes the self-contained connection subassembly 24, the bulb socket 20 and the power terminal connector 22. Other types of clamping or snap lock connection configurations may be utilized to secure the housing directly to the headliner substrate.

Although the present invention has been described in terms of a dome lamp assembly, it is to be understood that the present invention may be utilized for a variety of other automobile components such as indicator lights, compartments, electrical accessories, etc. which may be mounted to interior trim panels other than a headliner.

As can be seen, a dome lamp assembly has been described which is self-mounting directly to a preinstalled headliner without fastener attachment hardware. The lamp assembly is assembled to the headliner without tools in a virtual one step operation so as to minimize assembly time and labor. The lamp assembly (excluding the bulb and lens) is an integral unitary molded component with a self-contained attachment means which simplifies assembly as well as inventory control. Furthermore, the lamp assembly is weight efficient and may be utilized in a wide variety of vehicle models with only minimal adaptation for varying substrate thickness.

As will be apparent to persons skilled in the art, various modifications and adaptations of the structure above described will become readily apparent without departure from the spirit and scope of the intention, the scope of which is defined in the appended claims.

What is claimed is:

1. An automobile interior component assembly for mounting directly to an interior trim panel installed within an automobile and having opposed inner and outer surfaces comprising
    a component housing configured for insertion within a mounting opening in an interior trim panel which is already assembled within an automobile interior and clamp means for clamping against the inner and outer surfaces of the interior trim panel to secure the component housing directly to the interior trim panel, said clamp means being configured for applying clamping force generally orthogonal to the inner and outer surfaces of said interior trim panel.

2. The automobile interior component assembly of claim 1 wherein said clamp means comprises means for snap lock securement of the component housing to the interior trim panel.

3. The automobile interior component assembly of claim 1 wherein said clamp means is integrally formed with said component housing.

4. The automobile interior component assembly of claim 3 wherein said clamp means is self-contained.

5. The automobile interior component assembly of claim 1 wherein said component housing has first and second opposite sides and a retaining slot at said first side for friction fit reception of the trim panel and said clamping means being disposed at said second side.

6. The automobile interior component assembly of claim 1 wherein said clamp means comprises a latching arm movable between an unlatched position and a latched position with said latching arm connecting interior trim panel and said component housing in said latched position to secure said component housing to said interiors trim panel.

7. The automobile interior component assembly of claim 1 wherein
    the inner surface of the interior trim panel faces inwardly toward the automobile interior and the outer surface faces outwardly from the automobile interior, and
    said clamp means comprises a latching arm pivotably mounted to said component housing for movement between a latched position and an unlatched position, said latching arm having first and second opposite ends with said second end being configured to engage the outer surface of the interior trim panel so as to clamp the interior trim panel to the component housing when the latching arm is in the latched position.

8. An automobile lamp assembly for mounting directly to a preinstalled headliner having opposed inner and outer surfaces and a mounting opening comprising
    a lamp housing having a bulb socket and a power connection terminal, said lamp housing being configured for insertion within the mounting opening after installation of the preinstalled headliner;
    a lens detachably mounted to said lamp housing; and clamp means for clamping against the inner and outer surfaces of the preinstalled headliner to secure the lamp housing directly to the preinstalled headliner, said clamp means being configured for applying clamping force generally orthogonal to the inner and outer surfaces of said preinstalled headliner.

9. The automobile lamp assembly of claim 8 wherein said bulb socket, said power connection terminal and said clamp means are integrally formed with said lamp housing to provide a unitary structure.

10. The automobile lamp assembly of claim 9 wherein said clamp means is self-contained.

11. The automobile lamp of claim 9 wherein said lens is configured for snap lock mounting to said lamp housing.

12. The automobile lamp assembly of claim 9 wherein said clamp means comprises means for snap lock securement of the lamp housing to the preinstalled headliner.

13. The automobile lamp assembly of claim 9 wherein
    the inner surface of the preinstalled headliner faces inwardly toward the automobile interior and the outer surface faces outwardly from the automobile interior, and
    said clamp means comprises a latching arm pivotably mounted to said lamp housing form movement between a latched position and an unlatched position, said latching arm having first and second opposite ends with said second end being configured to engage the outer surface of the preinstalled headliner so as to clamp the preinstalled headliner to the lamp housing when the latching arm is in the latched position.

14. The automobile lamp assembly in claim 8 wherein said clamp means comprises means for snap lock securement of the lamp housing to the preinstalled headliner.

15. The automobile lamp assembly means comprises a latching arm movable between an unlatched position and a latched position with said latching arm connecting said preinstalled headliner and said lamp housing in said latched position to secure said lamp housing to said preinstalled headliner.

16. The automobile lamp assembly of claim 8 wherein the inner surface of the preinstalled headliner faces inwardly toward the automobile interior and the outer surface faces outwardly from the automobile interior, and said clamp means comprises a latching arm pivotably mounted to said lamp housing form movement between a latched position and an unlatched position, said latching arm having first and second opposite ends with said second end being configured to engage the outer surface of the preinstalled headliner so as to clamp the preinstalled headliner to the lamp housing when the latching arm is in the latched position.

17. A method of installing an interior lamp assembly in an automobile interior comprising providing a mounting opening in an installed headliner, positioning the interior lamp assembly within the mounting opening, and rigidly securing the interior lamp assembly directly to the installed headliner by clamping force generally orthogonal against opposed inner and outer surfaces of the installed headliner.

18. An automobile interior component assembly for mounting directly to an interior trim panel installed within an automobile having first and second opposed surfaces with the first surface facing inwardly toward the automobile interior and the second surface facing outwardly from the automobile interior, said automobile interior component assembly comprising a component housing configured for insertion within a mounting opening in an interior trim panel which is already assembled within an automobile interior, fastenerless connector means for securing the component housing directly to the interior trim panel comprising a latching arm pivotably mounted to said component housing for movement between a latched position and an unlatch position, said latching arm having first and second opposite ends with said second end being configured to engage the second surface of the interior trim panel so as to clamp the interior trim panel to the component housing when the latching arm is in the latched position, and said latching arm being integrally formed with said component housing and interconnected to said component housing by a living hinged for pivotal movement between said latched and unlatched positions.

19. An automobile interior component assembly for mounting directly to an interior trim panel installed within an automobile having first and second opposed surfaces with the first surface facing inwardly toward an automobile interior and the second surface facing outwardly from the automobile interior, said automobile interior component assembly comprising a component housing configured for insertion within a mounting opening in an interior trim panel which is already assembled within an automobile interior, fastenerless connector means for securing the component housing directly to the interior trim panel comprising a latching arm pivotably mounted to said component housing for movement between a latched position and an unlatched position, said latching arm having first and second opposite ends with said second end being configured to engage the second surface of the interior trim panel so as to clamp the interior trim panel to the component housing when the latching arm is in the latched position, said first end of said latching arm being configured for snap lock engagement with said component housing when the latching arm is in the latched position.

20. An automobile lamp assembly for mounting directly to a preinstalled headliner having a mounting opening and first and second opposed surfaces with the first surface facing inwardly toward an automobile interior and the second surface facing outwardly from the automobile interior comprising a lamp housing having a bulb socket and a power connection terminal, said lamp housing being configured for insertion within the mounting opening after installation of the preinstalled headliner;

a lens detachably mounted to said lamp housing; and fastenerless connector means for securing the lamp housing directly to the preinstalled headliner comprising a latching arm pivotally mounted to said lamp housing for movement between a latched position and an unlatched position, said latching arm having first and second opposite ends with said second end being configured to engage the second surface of the preinstalled headliner so as to clamp the preinstalled headliner to the lamp housing when the latching arm is in the latched position, said latching arm being interconnected to said lamp housing by a living hinge for pivotal movement being said latched and unlatched positions, and said bulb socket, said power connection terminal and said fasternerless connector means being integrally formed with said lamp housing to provide a unitary structure.

21. An automobile lamp assembly for mounting directly to a preinstalled headliner having a mounting opening and first and second opposed surfaces with the first surface facing inwardly toward an automobile interior and the second surface facing outwardly from the automobile interior comprising a lamp housing having a bulb socket and a power connection terminal, said lamp housing being configured for insertion with the mounting opening after installation of the preinstalled headliner;

a lens detachably mounted to said lamp housing; and fastenerless connector means for securing the lamp housing directly to the preinstalled headliner comprising a latching arm pivotally mounted to said lamp housing for movement between a latched position and an unlatched position, said latching arm having first and second opposite ends with said first end of said latching arm being configured for snap lock engagement with said lamp housing and said second end being configured to engage the second surface of the preinstalled headliner so as to clamp the preinstalled headliner to the lamp housing when the latching arm is in the latched position, said latching arm being interconnected to said lamp housing by a living hinge for pivotal movement between said latched and unlatched positions, and said bulb socket, said power connection terminal and said fastenerless connector means being integrally formed with said lamp housing to provide a unitary structure.

* * * * *